United States Patent

[11] 3,613,065

| [72] | Inventors | Howard C. Lindemann<br>Syosset;<br>Vladimir A. Mateyka, New Hyde Park;<br>John P. Strack, Bohemia; Willie A. Busch,<br>New Rochelle, all of N.Y. |
|---|---|---|
| [21] | Appl. No. | 16,168 |
| [22] | Filed | Mar. 3, 1970 |
| [45] | Patented | Oct. 12, 1971 |
| [73] | Assignee | Lindly & Company, Inc.<br>Mineola, N.Y. |

[54] APPARATUS UTILIZING A VIBRATABLE MEMBER FOR DETECTING SUSTAINED TENSION IN A RUNNING LENGTH OR STRAND
16 Claims, 11 Drawing Figs.

[52] U.S. Cl. .............................................. 340/259,
139/103, 139/351, 200/61.18, 340/261
[51] Int. Cl. .............................................. G08b 21/00
[50] Field of Search ........................................... 340/261,
259; 200/61.13, 61.18; 57/78, 81; 139/103, 109,
351, 353

[56] References Cited
UNITED STATES PATENTS
| 2,524,579 | 10/1950 | Taylor .......................... | 340/259 |
| 2,345,771 | 4/1944 | Reynolds ..................... | 340/261 |

*Primary Examiner*—John W. Caldwell
*Assistant Examiner*—J. Michael Bobbitt
*Attorneys*—Robert E. Burns and Emmanuel J. Lobato ABSTRACT: Yarn running through a guide carried by a vibratable member induces vibration of the vibratable member at its natural frequency. A transducer converts this vibration into an electrical signal which is fed to a circuit for detecting interruption of the signal in the event the yarn breaks. In some applications excessive tension in the yarn which may lead to breakage is detected before a break occurs either by detecting abnormal deflection of the vibratable member or by detecting abnormally high amplitude of vibration.

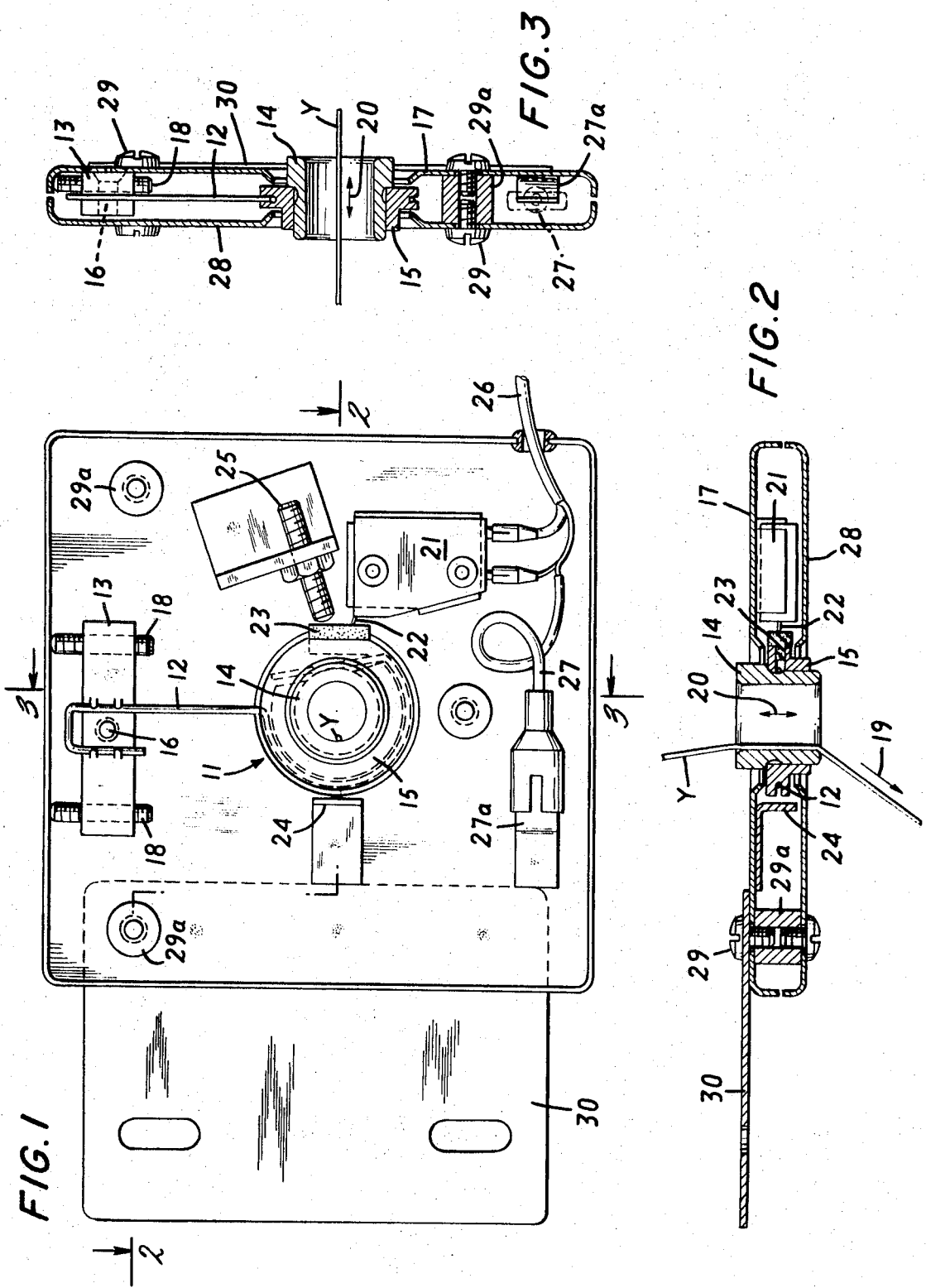

APPARATUS UTILIZING A VIBRATABLE MEMBER FOR DETECTING SUSTAINED TENSION IN A RUNNING LENGTH OR STRAND

The present invention relates to means for detecting the breaking of a single end of yarn and also, in some applications, for detecting excessive tension in a yarn before a break occurs. The term "yarn" is herein used in a generic sense to include thread, cord, wire, filaments, ribbons or other material in the form of strips or strands. The term "end" is also used in a generic sense to indicate the strip or strand material running together as a unit through a guide.

In equipment for producing, processing or using yarn as, for example, in spinning equipment, creels, looms and knitting machines, it is necessary for proper operation of the equipment to maintain the continuity of each end of yarn and to detect immediately any discontinuity. Moreover, from the point of view of economy of space and cost, it is important for the end break detector to be small, simple, compact and inexpensive while yet reliably providing an indication in the event an end of yarn breaks. The indication may be utilized as desired, for example to stop the machine or to provide an audible or visual signal to attract the attention of an operator or attendant either upon the occurrence of a single break or, if desired, by the cumulative effect of two or more breaks.

In accordance with the invention, mechanical vibration is generated by a yarn running over a yarn guide on a vibratable member and the mechanical vibration is converted into an electrical signal by suitable transducing means. The signal thus produced will continue as long as the yarn continues to run over the yarn guide. However, if the yarn breaks, the signal will be interrupted and this interruption is utilized to provide an indication of the break in the yarn end. The indication may be utilized as desired, for example to provide a visual or audible signal or to stop the equipment until the break has been repaired.

As the equipment on which the end break detectors are used may be subject to mechanical vibration by reason of their operation, it is necessary to avoid vibration of the vibratable member by virtue of vibration transmitted from the machine. Otherwise, the vibratable member may continue to vibrate even if a yarn breaks and hence no indication of the break is provided. In order to avoid disabling of the detector in this manner, it is necessary to discriminate between vibration generated by the running of the yarn over the yarn guide and vibration transmitted from the machine on which the detector is mounted. This can be accomplished by isolating the detector from the machine or by discriminating electrically between vibrations of different frequencies or by a combination of both means. For example, the detector can be isolated from high frequency vibrations occurring in the machine by means of suitable vibration damping mounts while lower frequency vibration can be discriminated electronically. Moreover, the natural frequency of vibration of the vibratable member is selected so as to facilitate discriminating it from spurious vibration.

The vibratable member may itself comprise or include suitable transducing means, for example a piezoelectric reed or a suitable transducer may be coupled with the vibratable member so as to be responsive to its vibrations. The vibratable member is arranged to vibrate with a principal component in the direction in which the yarn runs through the yarn guide and the transducing means is arranged to be responsive to vibrations in this direction. The yarn runs through the yarn guide with sufficient change of direction to provide frictional engagement of the yarn with the yarn guide sufficient to induce vibration in the vibratable member as long as the yarn continues to run through the yarn guide. The transducer is of any suitable type, for example a strain gauge or a piezoelectric cartridge or reed.

There is thus provided a simple, compact and inexpensive, yet highly effective means for detecting the breaking of a yarn end.

Moreover, since the breaking of a yarn is commonly caused by excessive tension, it is desirable in some applications to detect excessive tension in the yarn before a break occurs. In accordance with the invention this is achieved by detecting excessive deflection of the vibratable member by yarn tension or by detecting an amplitude of vibration above a selected level.

The nature and advantages of the invention will be more fully understood from the following description and claims in conjunction with the accompanying drawings which illustrate by way of example preferred embodiments of the invention and in which:

FIG. 1 is a plan of a single end break detector in accordance with the invention;

FIG. 2 is a section taken approximately on the line 2—2 in FIG. 1;

FIG. 3 is a section taken approximately on the line 3—3 in FIG. 1;

Figure 4:
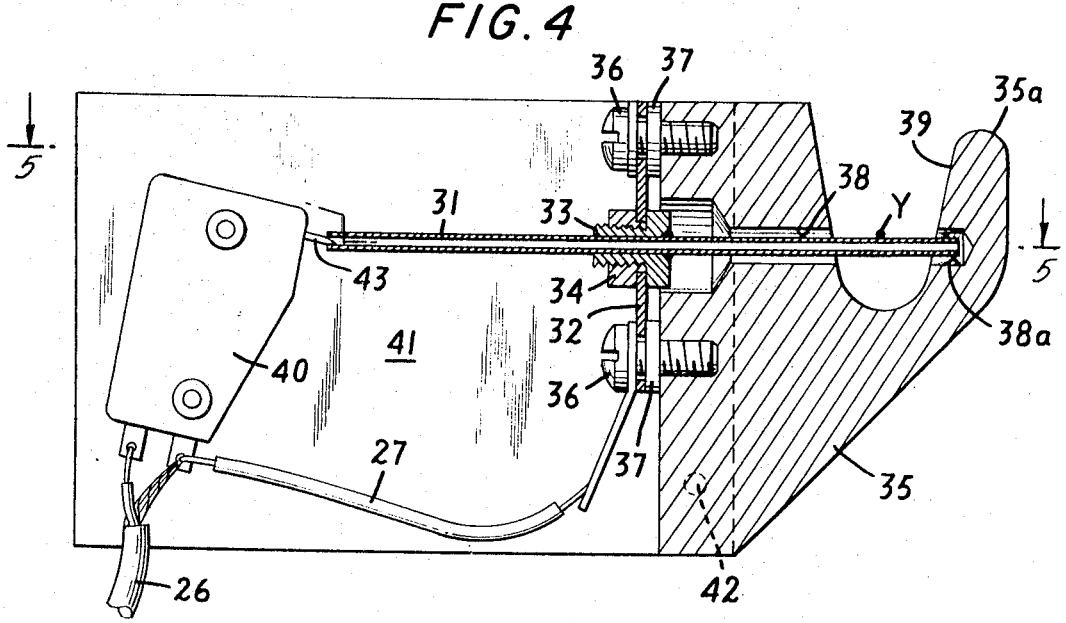
FIG. 4 is a side view partially in section of another single end break detector in accordance with the invention.

In the embodiment shown by way of example in FIGS. 1 to 3, a vibratable member 11 is shown as comprising a spring arm 12 which is secured at one end to a support 13 and at the other end carries a yarn guide 14. The spring arm 12 is shown as a spring wire having one end portion fixed to the support 13 and the other end portion shaped to receive the yarn guide 14, which is shown as a short tubular member mounted on the spring arm by means of a collar 15 having a peripheral groove in which the spring wire 12 is received. The yarn guide is of hard wear resisting material, for example a ceramic composition. The support 13 on which the vibratable member is mounted is pivotally supported by a pivot 16 on a backplate 17 which is formed, for example, as a sheet metal stamping. Adjusting screws 18 which are screwed through threaded holes in end portions of the support 13 are engageable with a bent-over rim portion of the back plate so as to adjust the position of the support 13 rotationally about its pivot and thereby adjust the position of the vibratable member.

As seen particularly in FIGS. 2 and 3, a yarn Y runs through the yarn guide 14 with a change of direction so as frictionally to engage the yarn guide on one side. By reason of the frictionally engagement of the yarn with the yarn guide, movement of the yarn in a lengthwise direction as indicated by the arrow 19 in FIG. 2 induces in the vibratable member comprising the yarn guide and the spring arm 12 a vibratory movement in the direction of the arrow 20, i.e. in the direction of travel of the yarn through the yarn guide. The vibratable member vibrates at a natural frequency determined by the stiffness and length of the spring arm 12 and the weight of the spring arm together with that of the yarn guide 14 and mounting collar 15. As long as the yarn Y continues to run through the yarn guide, vibration of the vibratable member 11 continues. If, however, the yarn 11 breaks so that it no longer runs through the yarn guide, vibration of the vibratable member 11 will cease.

Vibration of the vibratable member 11 is converted into an electrical signal by means of a transducer 21 which is shown by way of example as a piezoelectric cartridge of the kind used for a phonograph pickup. The cartridge has a stylus 22 which engages a resilient pad 23 on the vibratable member 11 so as to couple the vibratable member with the transducer. The pad 23 is, for example, formed of an elastomeric material such as polyurethane which provides good frictional engagement with the stylus 22 of the transducer cartridge 21 while avoiding damage to the stylus. The position of the vibratable member can be adjusted by the screws 18 to provide the desired pressure of the stylus 22 on the pad 23. By reason of the manner in which the yarn runs through the guide as seen in FIGS. 1 and 2, excessive tension in the yarn deflects the yarn guide laterally away from the cartridge so as to disengage the pad 23 from the stylus 22. The resulting interruption of the signal generated by the transducer provides an indication that the tension in the yarn is excessive.

Movement of the end portion of the vibratable member 11 in a direction away from the cartridge 21 is limited by a stop 24 secured to the backplate 17 and movement toward the cartridge is limited by an adjustable stop screw 25 engageable with the pad 23. The stops 24 and 25 are spaced slightly from the vibratable member under normal conditions so as to permit its free vibration while limiting its lateral movement and protecting the stylus against excessive pressure. The cartridge 21 is arranged so that it is actuated by movement of the stylus 22 in the direction of vibrational movement of the vibratable member 11 i.e. in a direction perpendicular to the paper as viewed in FIG. 1. The transducer 21 is connected by leads 26 to a suitable electrical circuit for utilizing the signal generated by the transducer 21 by reason of vibration of the vibratable member 11. A grounding lead 27 is connected to a grounding lug 27a on the backplate 17. The circuitry will be described below with reference to FIG. 11 of the drawings.

A cover plate 28 is removably secured to the backplate 17 by means of screws 29 and spacing collars 29a so as to enclose the cartridge 21 and the vibratable member 11 except that the back plate and cover plate have aligned openings to accommodate the yarn guide and permit the threading of a yarn through the yarn guide. The backplate 11 is secured, for example by spot welding, to a sheet metal bracket 30 by means of which the unit is conveniently mounted on a machine on which it is to be used.

Figure 5:
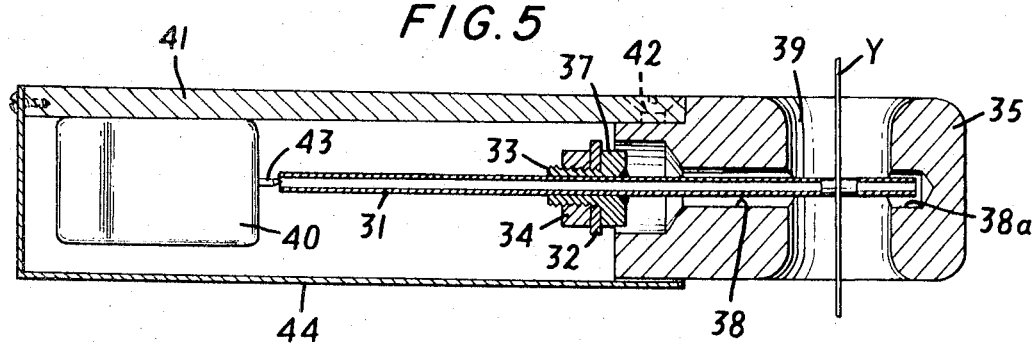
FIG. 5 is a section taken approximately on the line 5—5 in FIG. 4.
Figure 6:
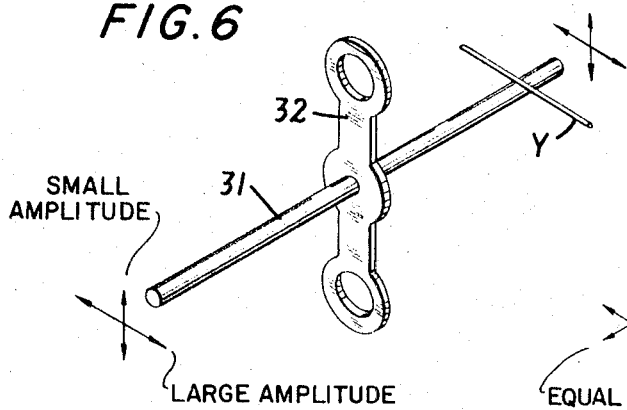
FIG. 6 is a schematic perspective view illustrating the mounting and mode of vibration of the vibratable member of the single end break detector illustrated in FIGS. 4 and 5.

In FIGS. 4 to 6 there is shown a single end break detector having a vibratable member 31 in the form of an elongated member, herein referred to as a shaft, which is supported at or near its midpoint by means of a torsion member shown as a spring 32. The shaft 31 extends through a hole in a midportion of the spring 32 and is secured to the spring by means of a bushing 33 which is secured to the shaft 31, for example by brazing or soldering, and has a threaded stem portion which extends through the hole in the spring 32 and receives a nut 34 which is screwed tightly against the spring. Opposite end portions of the spring 32 are secured to a casting 35 for example by means of screws 36 provided with spacing washers 37 for spacing the spring from the face of the casting. The shaft 31 extends through a hole 38 in the casting 35 which is provided with a notch or recess 39 affording entry for a yarn Y to bear on an end portion of the shaft 31. The shaft extends across the recess 39 and into a blind hole 38a in a nose portion 35a of the casting.

As seen in FIGS. 4 and 5, the yarn Y runs across the shaft 31 in a direction approximately perpendicular to the shaft and thereby causes the shaft to vibrate in an oscillatory manner about its midpoint as a node. The vibration is effected by torsion of the spring 32 and possibly also some flexing of the shaft 31. As illustrated schematically in FIG. 6, the configuration and mounting of the spring 32 permits relatively large amplitude of vibration in the direction of travel of the yarn as illustrated by the longer arrows while vibration in a direction perpendicular to the travel of the yarn is restrained as illustrated by the smaller arrows. By reason of the shaft 31 being supported at approximately its midpoint, it provides a balanced construction so as to avoid or mitigate the effect of any vibration to which the casting 35 may be subjected by reason of its being mounted on a machine which is subject to vibration.

The vibratable member 31 is shown as a hollow shaft and can be made for example of material such as stainless steel tubing. At least the portion of the shaft engaged by the yarn Y is preferably protected by ceramic or other abrasion-resisting material so as to avoid wearing of the shaft by the yarn running across it.

Vibration of the shaft 31 induced by the yarn Y running across it is sensed by means of a suitable transducer which is shown as being a piezoelectric cartridge 40 of the kind used for a phonograph pickup. The cartridge 40 is suitably mounted on a backplate 41 secured to the casting 35 for example by suitable screws 42. The cartridge 40 is conveniently coupled with the vibrating shaft 31 by inserting the tip of the cartridge stylus 43 into the hollow end portion of the shaft as seen in FIGS. 4 and 5. The end of the stylus is preferably tapered and is pressed lightly into the end of the bore of the hollow shaft 31 to provide an effective coupling of the transducer with the shaft.

The diameter of the holes 38, 38a is sufficiently greater than the diameter of the shaft 31 to permit normal vibration of the shaft but to prevent excessive movement of the shaft which would damage the cartridge 40 or its stylus 43.

The cartridge is provided with leads 26 for connecting it to suitable circuitry which will be described below and with a ground lead 27 connected to the casting 35 by one of the screws 36. A removable cover plate 44 is secured to the backplate 41 so as to enclose the cartridge 40 and the rear end portion of the vibratable shaft 31. Hence, the only portion of the shaft that is exposed is the portion extending across the recess 39 of the casting 35. The cartridge 40 is mounted in such manner that it is responsive to vibrations of the shaft 31 in the direction of travel of the yarn Y as indicated by the larger arrows in FIG. 6. Hence, as long as the yarn Y continues to run across the forward end portion of the shaft 31, the transducer 40 will generate an electrical signal having a frequency corresponding to the natural frequency of vibration of the shaft 31 as determined by its length and mass and by the characteristics of the spring 32 by means of which it is mounted.

Figure 7:
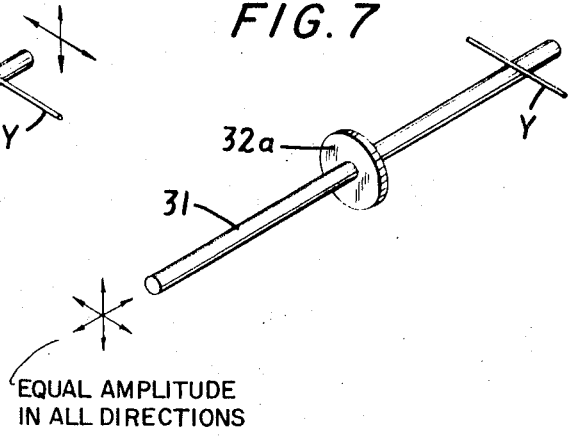
FIG. 7 is a schematic view similar to FIG. 6 showing a different mounting of the vibratable member.

In FIG. 7 there is shown schematically an arrangement which differs from that of FIG. 6 in that the shaft 31 is mounted by means of a symmetrical spring diaphragm 32a which is suitably held at its edge and permits vibration of the shaft 31 with equal amplitude in all directions perpendicular to its length as indicated by the arrows.

Figure 8:
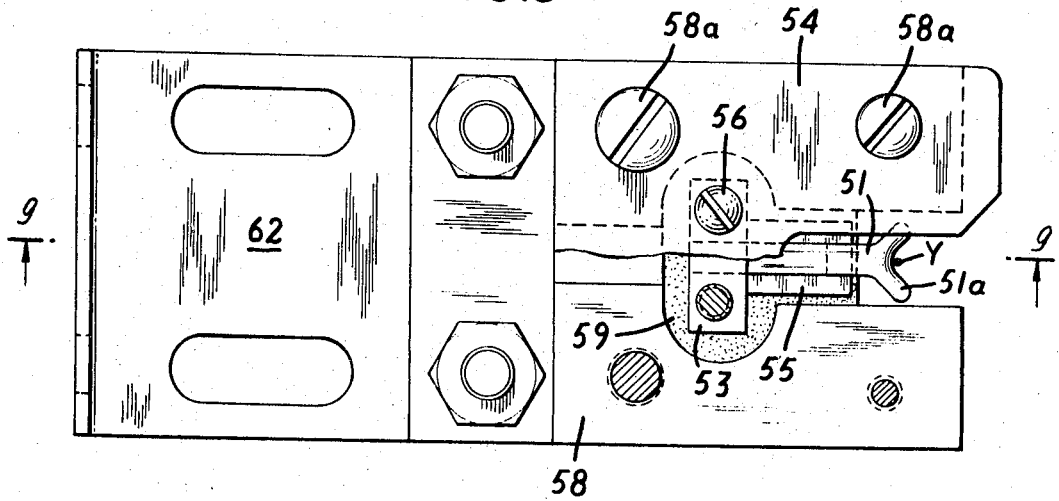
FIG. 8 is a plan of a third end break detector in accordance with the invention.
Figure 9:
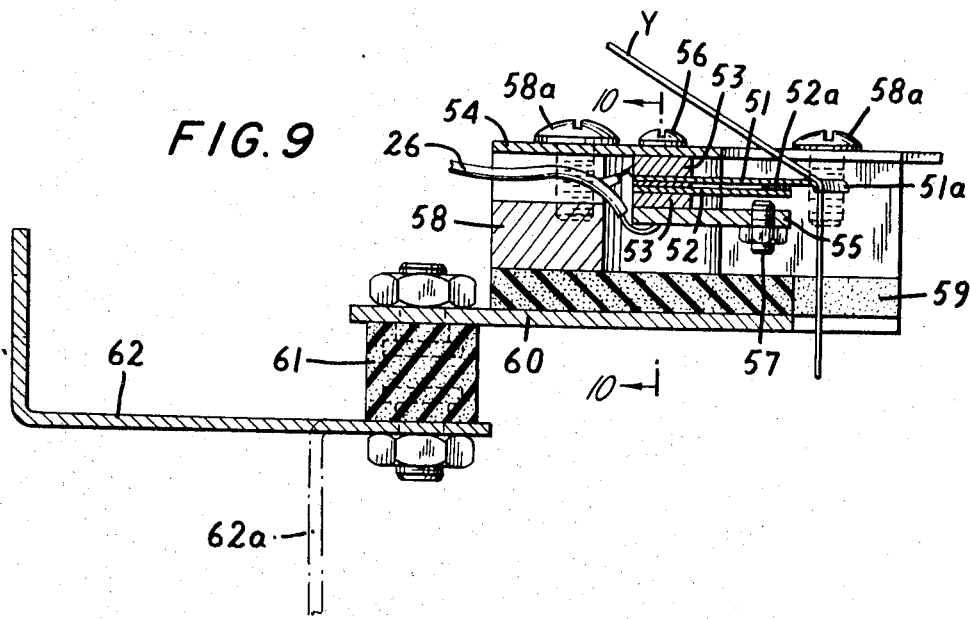
FIG. 9 is a section taken approximately on the line 9—9 in FIG. 8.
Figure 10:
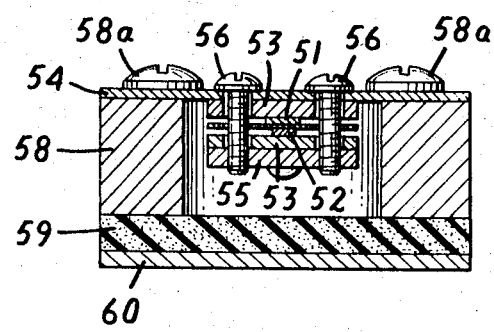
FIG. 10 is a section taken approximately on the line 10—10 in FIG. 9.

In FIGS. 8 to 10 there is shown a single end break detector having a vibratable member in the form of a spring tongue 51 which is fixedly mounted at one end while the other end 51a is shaped to provide a yarn guide, for example in the form of a Y. The portion of the spring tongue 51 that is engaged by the yarn Y is provided with a wear-resist surface for example by being flame coated with ceramic material. The spring tongue 51 together with a reed of piezoelectric ceramic in the form of a rectangular bar 52 are mounted parallel to one another by means of spacing blocks 53 secured between a top plate 54 and an intermediate plate 55 by means of screws 56 made of nylon or other insulating material. The ceramic reed 52 is coupled with the spring tongue 51 by means of a rubber pad 52a provided near the outer end of the reed. It will be noted that the reed is shorter than the spring tongue 51 so that it does not interfere with the yarn guide portion 51a. The frequency of vibration of the vibratable member, herein referred to as the natural frequency, is determined by the characteristics of the system comprising the spring tongue 51, the ceramic reed 52 and the coupling between them. Downward deflection of the tongue and reed is limited by means of an adjustable screw 57 to avoid excessive flexing of the ceramic reed.

The top plate 54 is secured by screws 58a to a heavy block 58 which in turn is supported by a cushion 59 on a mounting plate 60. The cushion 59 may for example be of vibration isolating material such as rubber or foam suitably secured to both the block 58 and mounting plate 60 for example by vulcanizing or cementing. The top plate 54, block 58, cushion 59 and mounting plate 60 are provided with suitable cutouts to permit a yarn Y to run over the yarn guide portion 51a of the tongue 51 as illustrated in FIG. 9. The mounting plate 60 is supported by vibration isolators 61 on a mounting bracket 62 by means of which the end break detector can be mounted on the machine or equipment on which it is to be used. The mounting bracket can, if desired, be bent down to the position 62a shown in broken lines to adapt it for mounting on different machines. The vibration isolators 61 together with the cushion 59 and the mass provided by the block 58 provide isolation of the vibratable member 51 and piezoelectric reed 52 from vibration occurring in the machine on which the end break detector is mounted. The characteristics of the vibration isolating means are chosen so as to damp out vibrations which might induce vibration of the vibratable member 51 and in particular vibration having a frequency of the order of the natural frequency of vibration of the vibratable member. The reed 52, which constitutes a transducer to convert mechanical vibration into an electrical signal, is provided with suitable leads 26 which are connected with opposite faces of the reed through conductive spacer blocks between which it is clamped. While the piezoelectric reed itself can be used as the vibratable member, the arrangement shown is preferred since piezoelectric reeds presently available do not have sufficient mechanical strength to be used alone.

The stop 57 can, if desired, be replaced by an electrical contact or micro switch which is actuated by flexing on the tongue 51 and reed 52 beyond a predetermined amount. In this manner, with the yarn running over the yarn guide portion of the spring arm in the manner illustrated in FIG. 9, excessive tension in the yarn will result in the tongue 51 and reed 52 being deflected downwardly so as to actuate the contact or micro switch. The detector is thereby made responsive to excess tension.

Figure 11:
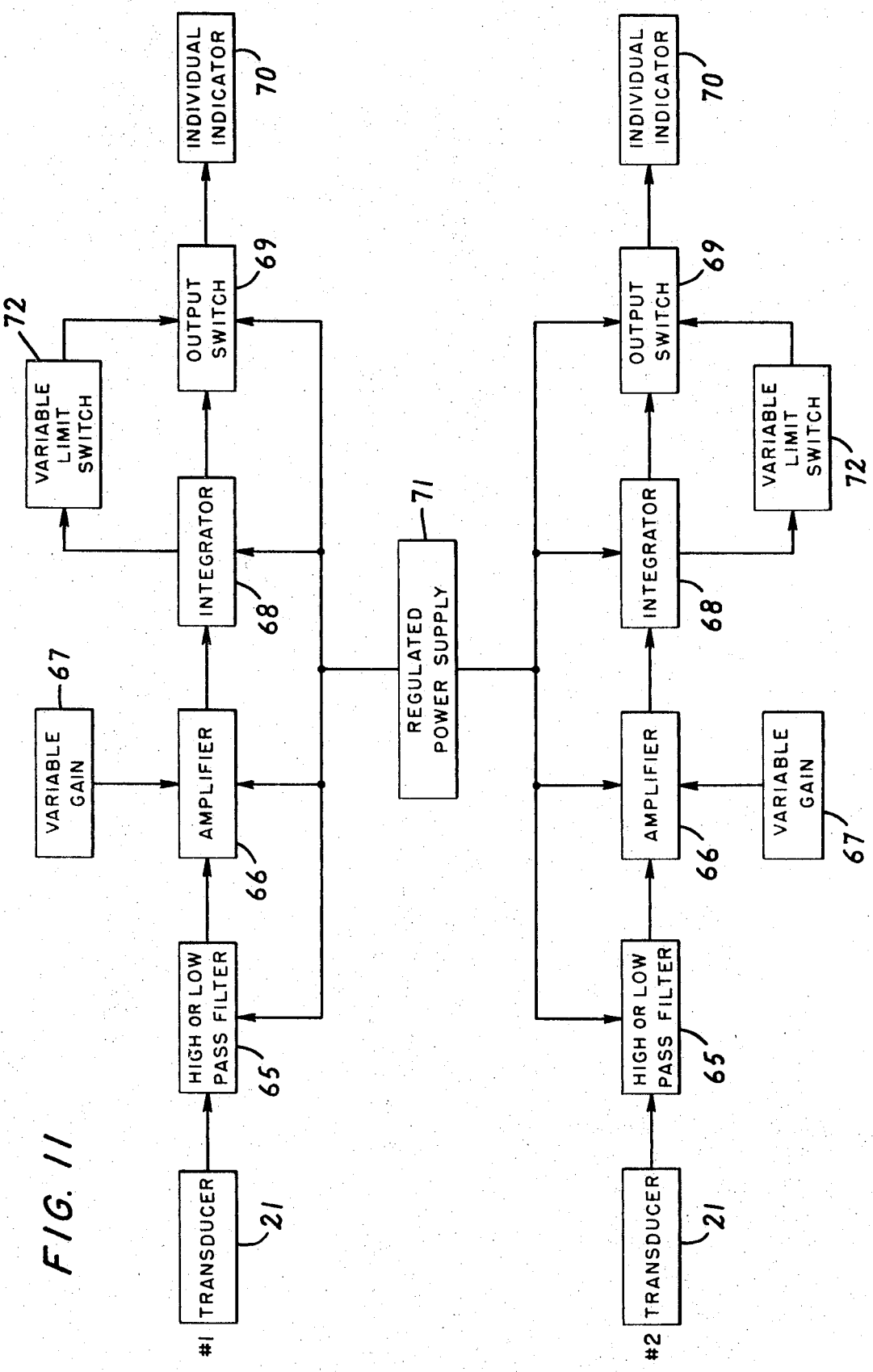
FIG. 11 is a block diagram illustrating by way of example circuitry suitable for use in the end break detectors illustrated in FIGS. 1 to 10.

The electrical signal produced by the transducing means of the single end break detector as long a vibration of the vibratable member is induced by yarn running over the yarn guide portion may be utilized in any desired manner by suitable circuitry. An example of circuitry that may be used is illustrated schematically in FIG. 11. While circuitry is shown for only two detector units, it will be understood that similar circuitry may be used for any desired number of detectors. As illustrated in FIG. 11, the transducer (which has been designated by the reference numeral 21 as in FIGS. 1 to 3) of each detector is connected through a filter 65 with the input of an amplifier 66 having a variable gain control 67. The output of the amplifier 66 is fed to an integrator 68, the output of which is connected to an output switch 69 controlling an indicator 70. Power for the filter 65, amplifier 66, integrator 68 and output switch 69 of all units is furnished by a regulated power supply 71.

The characteristics of the filter 65 are selected according to the natural frequency of the vibratable member of the detecting unit and the characteristics of any isolating means that may be used as described for example with reference to FIGS. 8 to 10 for isolating the detector from the machine on which it is mounted. The filter 65 may be a high-pass filter, a low pass filter or a band-pass filter as desired. When the detectors are being used on machines which generate both low-frequency and high-frequency vibration, a convenient arrangement is to use suitable vibration damping means to isolate the detector from high-frequency vibration of the machine and to use a filter to eliminate low frequency. The natural frequency of the vibratable member of the detector is selected so as to be higher than low-frequency vibrations that may occur in the yarn for example by spinning operations. For good results it has been found desirable to design the vibratable member so that it has a frequency of at least 400 cycles per second and preferably not less than 1 kc., for example in the range of 1 kc. to 2 kc. The vibration isolating means used in mounting the detector on a machine should preferably damp out vibration of higher frequencies including frequencies in the range of the frequency of vibration of the vibratable member of the detector and higher frequencies. Moreover, when a combination of mechanical isolation and electronic filtering is used, there should be an overlap of the higher frequencies which are blocked or dissipated by the mechanical damping means and the lower frequencies that are filtered out by the filtering means.

The variable gain control 67 controls the amplification provided by the amplifier 66 so as to provide a signal of the desired amplitude. The characteristics of the integrator 68 are selected so that the output switch 69 is actuated only when there is an interruption of the signal received from the transducer for a predetermined length of time indicating a break of the yarn. Hence, the output switch will not be actuated in the event that a single pulse or cycle of the signal is for some reason attenuated or missing. By suitable selection of the integrator, false stops can be avoided while at the same time assuring prompt indication of a yarn break.

Excessive tension in the yarn may be detected by lateral deflection of the vibratable member in a direction perpendicular to its direction of vibration so as to disengage it from the transducing means as described with reference to FIGS. 1 to 3, or by excessive deflection of the vibratable member in the direction of vibration to actuate a contact or micro switch as described with reference to FIGS. 8 to 10. Excessive tension may also be detected by means responsive to the amplitude of vibration of the vibratable member. In general, higher tension of the yarn and the resulting greater frictional engagement of the yarn with the yarn guide of the vibratable member results in greater amplitude of vibration, other factors being equal. Greater amplitude of vibration in turn results in a greater amplitude of the signal generated by the transducing means. Hence, by setting a threshold on the amplitude of the signal, excessive tension in the yarn can be detected. A convenient means responsive to signal amplitude is illustrated in FIG. 11 where there is shown a variable limit switch 72 having its input connected to an output of the integrator 68 and its output connected to the output switch 69. When the output voltage of the integrator 68 exceeds a selected value, by reason of higher amplitude of the signal generated by the transducer 21, the variable limit switch is actuated to actuate the output switch 69. The output switch is also actuatable directly by the integrator 68 in the event the output voltage of the integrator drops by reason of decrease in amplitude or interruption of the signal from the transducer. Hence, the circuit as illustrated in FIG. 11 is responsive both to excessive tension and to breaking of the yarn. As a breakage of the yarn is frequently caused by excess tension, the tension-responsive characteristic of the detector provides an early indication of abnormal operation. The variable limit switch 72 may be omitted if it is not desired to make the detector tension-responsive in this manner.

The output switches 69 may be used to control any desired device. For example, each output switch may be connected as shown to an individual visual or audio indicator. When it is desired to stop the machine in the event of breakage of a single end of yarn, the output switches may be connected to a suitable stop-motion relay. Alternatively, the output switches may be connected to a computer or suitable integrating means, for example to provide a quality control record or to stop the machine only after the occurrence of a selected number of breakages.

While preferred embodiments of the invention have been shown by way of example in the drawings and have been particularly described, it will be understood that many modifications may be made and that individual features of the several embodiments are mutually interchangeable insofar as they are compatible. For example, suitable vibration isolating means for mounting the detectors on a machine may be provided in the embodiments of FIGS. 1 to 3 and 4 to 7 as well as in the embodiment of FIGS. 8 to 11.

What we claim and desire to secure by letters patent is:

1. A single end break detector comprising a vibratable member having a natural frequency of vibration, a yarn guide carried by said vibratable member engageable by a yarn running in a lengthwise direction, means for supporting said vibratable member for vibration in a direction having a principal component in the direction of travel of said yarn through said yarn guide so that the running of said yarn through said yarn guide induces vibration of said vibratable member substantially at its natural frequency of vibration, transducing means for converting the vibration of said vibratable member into an electrical signal, said signal being interrupted in the event of breakage of said yarn and the consequent interruption of vibration of said vibratable body, and circuit means for detecting the interruption of said signal.

2. A single end break detector according to claim 1, in which said vibratable member comprises a spring arm anchored at one end by said supporting means and carrying said yarn guide at the opposite end.

3. A single end break detector according to claim 2, in which said transducing means comprises a piezoelectric cartridge mounted adjacent said opposite end of said spring arm and having a sensing element coupled with said opposite end of said spring arm.

4. A single end break detector according to claim 3, in which said sensing element comprises a stylus and in which a resilient pad carried by said opposite end of said spring arm is engaged by said stylus to transmit to said stylus vibratory movement of said opposite end of said spring arm.

5. A single end break detector according to claim 1, in which said vibratable member comprises an elongated member and in which said supporting means comprises means resiliently supporting said elongated member at approximately its midpoint for oscillation about said support point as a node, said yarn guide being carried by one end of said elongated member and said transducing means being associated with the opposite end of said elongated member.

6. A single end break detector according to claim 5, in which said yarn guide comprises an end portion of said elongated member, said end portion having a hard wear-resisting surface.

7. A single end break detector according to claim 5, in which said elongated member is approximately balanced statically and dynamically with respect to said support point.

8. A single end break detector according to claim 5, in which said transducing means comprises a piezoelectric cartridge having a sensing element coupled with said opposite end of said elongated member.

9. A single end break detector according to claim 5, in which said supporting means comprises a resilient support anchored at opposite sides, said shaft being secured to a midportion of said support.

10. A single end break detector according to claim 9, in which said elongated member supported by said resilient support has greater freedom of movement in the direction of travel of said yarn than in a direction perpendicular to the travel of said yarn.

11. A single end break detector according to claim 1, in which said vibratable member comprises a spring tongue mounted at one end by said mounting means and carrying said yarn guide at the opposite end, and in which said transducing means comprises a piezoelectric element in the form of a reed mounted at one end by said mounting means and having an opposite end coupled with said spring tongue so that the said piezoelectric element is driven by said spring tongue.

12. A single end break detector according to claim 1, comprising means for mounting said detector on yarn-handling apparatus subject to mechanical vibration of various frequencies, said mounting means comprising means for isolating said detector from mechanical vibration of said apparatus of frequencies in the range of the natural frequency of vibration of said vibratable member.

13. A single end break detector according to claim 1, in which said circuit means comprises means for discriminating said electrical signal having a frequency corresponding to the natural frequency of said vibratable member from frequencies substantially different from said natural frequency, whereby said detecting means is not responsive to such different frequencies.

14. A single end break detector according to claim 1, in which said circuit means comprises integrating means arranged so that said detecting means respond to an interruption of said signal only when said interruption persists for a selected period of time.

15. A single end break detector according to claim 1, comprising means responsive to predetermined deflection of said vibratable member by excessive tension of said yarn to provide an indication of such tension.

16. A single end break detector according to claim 1, in which the amplitude of vibration of said vibratable member and the amplitude of said signal increase with increase of tension of said yarn and in which said circuit means includes means responsive to an amplitude of said signal above a selected level to provide an indication of excessive tension of said yarn.